Dec. 22, 1925.
C. B. SCOVILLE, JR
1,566,620
AIR COMPRESSOR
Filed Oct. 1, 1923
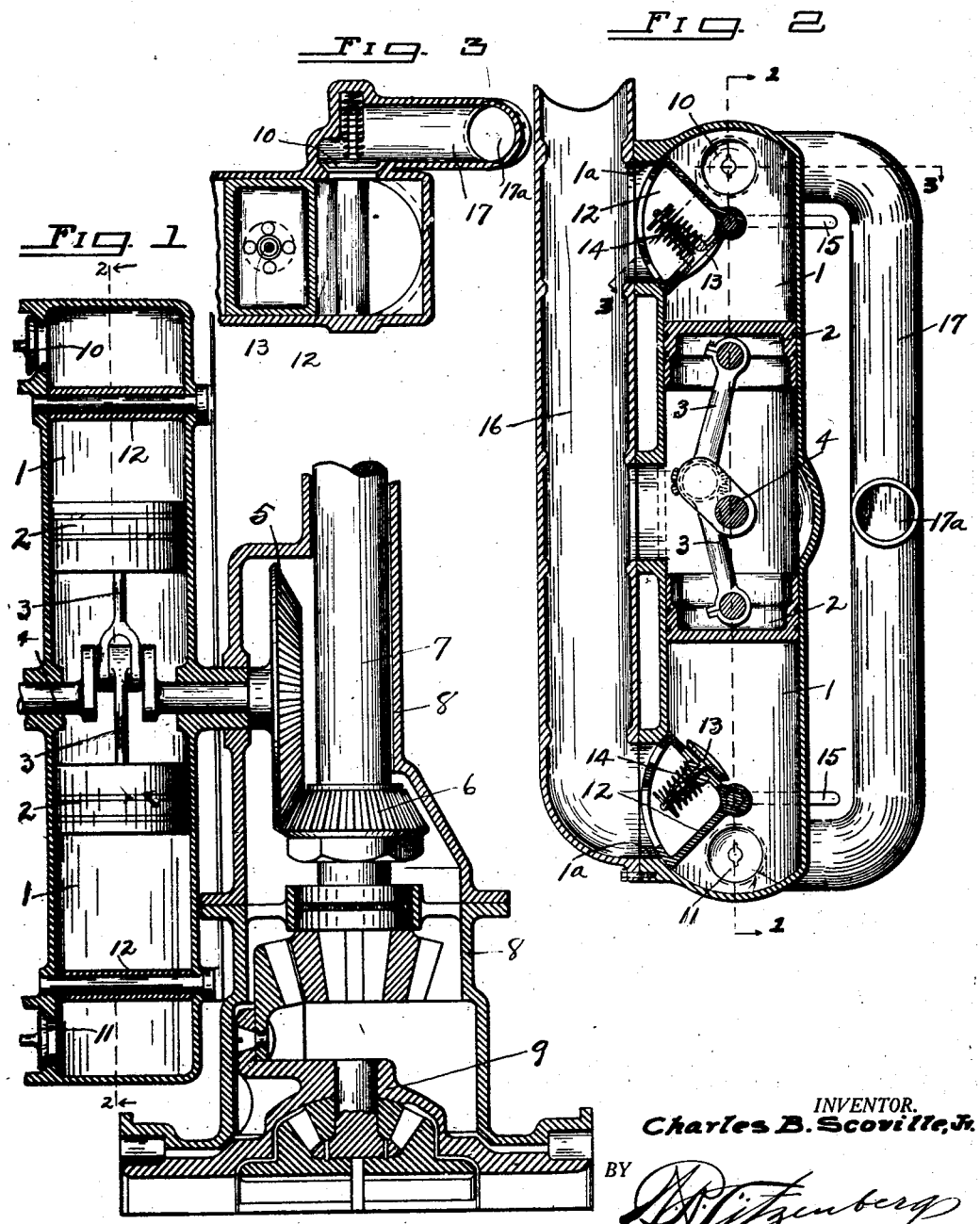
INVENTOR.
Charles B. Scoville, Jr.
BY
ATTORNEY.

Patented Dec. 22, 1925.

1,566,620

UNITED STATES PATENT OFFICE.

CHARLES B. SCOVILLE, JR., OF PASADENA, CALIFORNIA.

AIR COMPRESSOR.

Application filed October 1, 1923. Serial No. 665,846.

*To all whom it may concern:*

Be it known that I, CHARLES B. SCOVILLE, Jr., a citizen of the United States, residing in the city of Pasadena, county of Los Angeles, and State of California, have invented certain new and useful Improvements in Air Compressors, of which the following is a specification.

My invention relates to air compressors of the type shown in my application, Serial No. 567,508, and is designed especially for use in connection with a motor vehicle for the purpose of compressing air for any desired use, such, for example, as operating air-operated brakes, or for any other use for which compressed air can be used. It is intended that the compressor shall be permanently connected with the operating parts of the motor vehicle so that it will be operated whenever the vehicle is moving, but I have provided gate valves to be opened when it is desired that there shall be no compression, thus reducing the friction to a minimum, the compressor pistons moving freely and putting no substantial additional load on the vehicle. It is also my purpose to so arrange the mechanism that the gate valves can be closed at will, as when the motor vehicle is to stop, whereupon the momentum of the vehicle is used to actually operate the compressors, and the compressors operating in turn to stop the vehicle. And if air brakes are used in connection with the compressor, the supply of compressed air from the compressor, operated by the momentum of the vehicle, can be connected directly with the cylinders of the air brake mechanism, as will be well understood without special showing.

In order to fully explain my invention, I have shown one practical embodiment thereof in the accompanying sheet of drawings, which I will now describe.

Figure 1 is a horizontal sectional view through a compressor embodying my invention, and taken on line 1—1, of Fig. 2;

Figure 2 is a sectional view taken on line 2—2, of Fig. 1; and

Figure 3 is a sectional view taken on line 3—3, of Fig. 2.

Referring now in detail to the drawings, my compressor as here illustrated, comprises a double cylinder, 1, 1, with two pistons, 2, 2, therein, connected by means of piston rods, 3, 3, to a crank shaft 4, provided at one end with a beveled gear, 5, in mesh with a small beveled gear, 6, on the rear axle, 7, in the rear axle housing, 8, and in which the differential mechanism, 9, is mounted, only part of which is shown, but which is well understood. Two outlet check valves, 10, 11, are arranged in the opposite ends of the double cylinders, 1, 1, as shown. Mounted in each end of said double cylinder, is a gate valve, as 12, of segmental form, closing the openings, 1ª, 1ª, from said cylinders, as clearly indicated in Fig. 2. Said gate valves are of hollow construction, and are provided with check valves, 13, 13, normally held closed by means of springs, 14, 14. Said valves are set to permit intake as the pistons are operated, if the gate valve be closed, in the positions indicated. Said gate valves are also provided with operating levers, as 15, 15, which may be connected by any suitable means for convenient operation by the operator of the vehicle, whereby he can readily move the gate valves to open, or closed, positions.

It will be understood that when said gate valves are open, the pistons operate without any load, for the cylinders 1, 1, are connected through the pipe, 16, with the atmosphere. The outlet check valves 10 and 11, are connected with a pipe, 17, provided with means, as at 17ª, for connecting it with any suitable storage, or place of use and to which compressed air is to be conducted.

By the simple closing of the gate valves, as for example, when the vehicle is to come to a stop, the momentum of the machine will operate the compressor and the storage of air under pressure will be accomplished, or the compressed air connected directly to mechanism operating to more quickly stop the machine, as if connected with the well known air brake mechanism.

While I have illustrated one practical embodiment of the machine, I do not limit my invention to the details or arrangement shown, except as I may be limited by the hereto appended claims.

I claim:

1. In an air compressor, a cylinder, a piston working therein, an outlet check valve, a pivoted gate valve to open said cylinder to the atmosphere, and a check valve set within said gate valve and moving therewith and operating as an inlet check valve when said gate valve is closed.

2. In an air compressor, a duplex cylinder, two pistons therein connected with a common crank shaft for simultaneous operation in the same directions, outlet check valves in said cylinder, two pivoted gate valves in the opposite ends of said cylinder and wholly within the same adapted to open said cylinder to the atmosphere, inlet check valves set in and moving with said gate valves, and means for operating said gate valves to open said cylinder to the atmosphere, substantially as described.

3. In a pumping stop combination, a pivoted gate valve having a chamber therein, and a check valve within said chamber in said gate valve and normally closing an opening through said gate valve into said chamber, whereby said gate valve can be moved and said check valve can function independently of the movement of said gate valve.

Signed at Pasadena, Los Angeles County, California, this 21st day of September, 1923.

CHARLES B. SCOVILLE, Jr.